Oct. 6, 1970        D. T. HOSTETLER        3,532,236

TRUCK CAMPER RIG WITH CAMPER AXLE DOLLY

Filed Jan. 27, 1969        4 Sheets-Sheet 1

INVENTOR.
Daniel T. Hostetler
BY
Frease & Bishop
ATTORNEYS

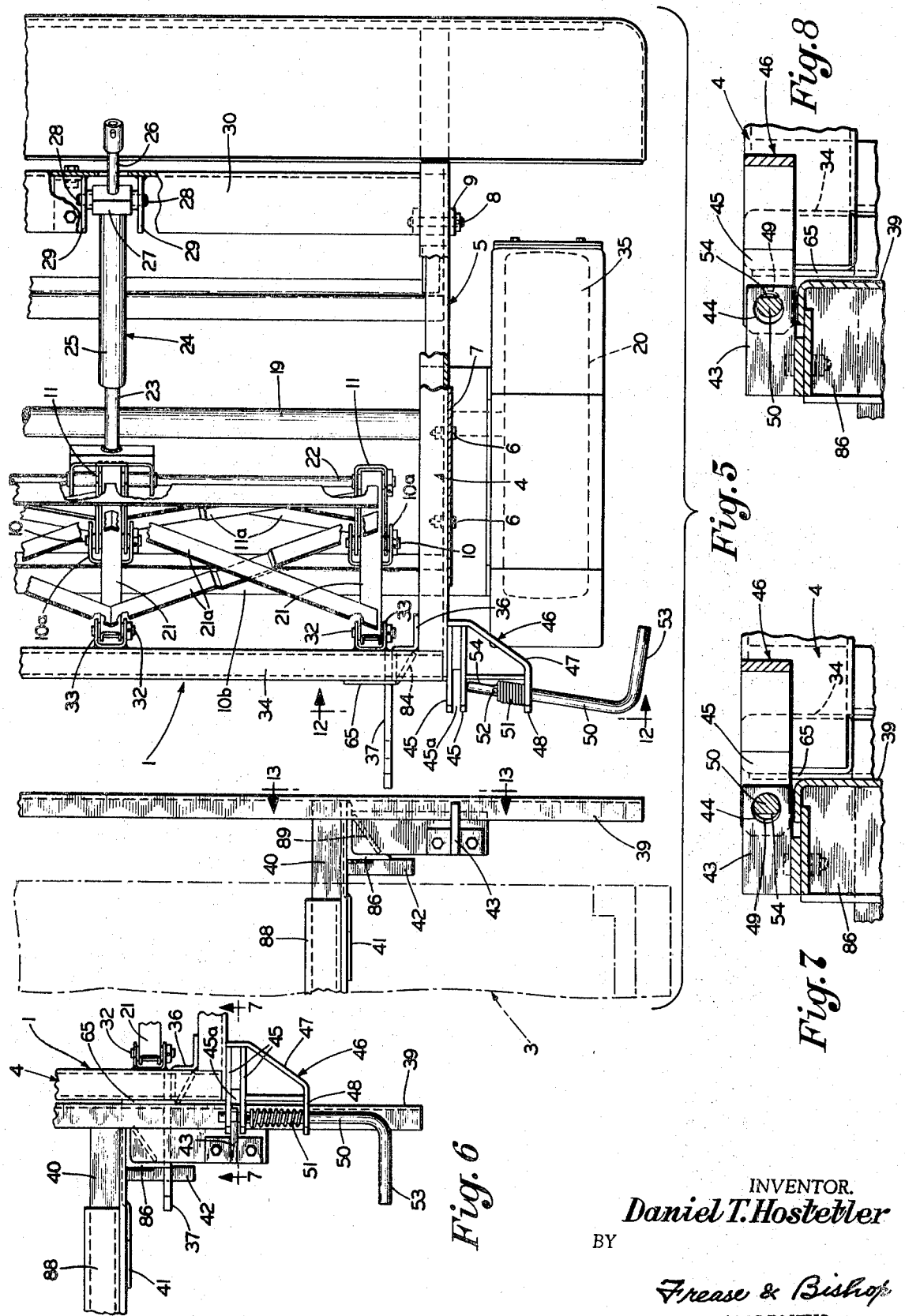

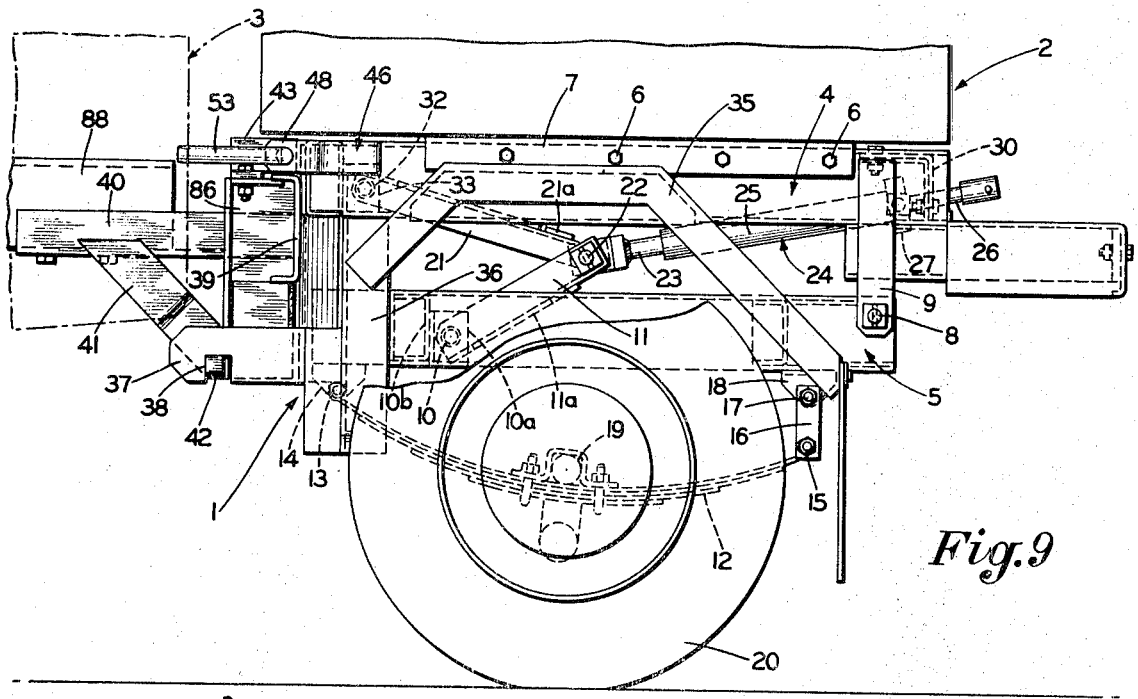

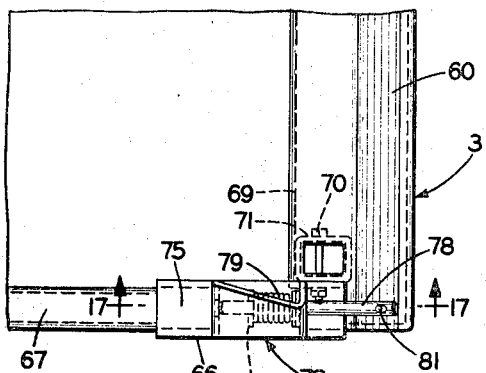
Fig.15
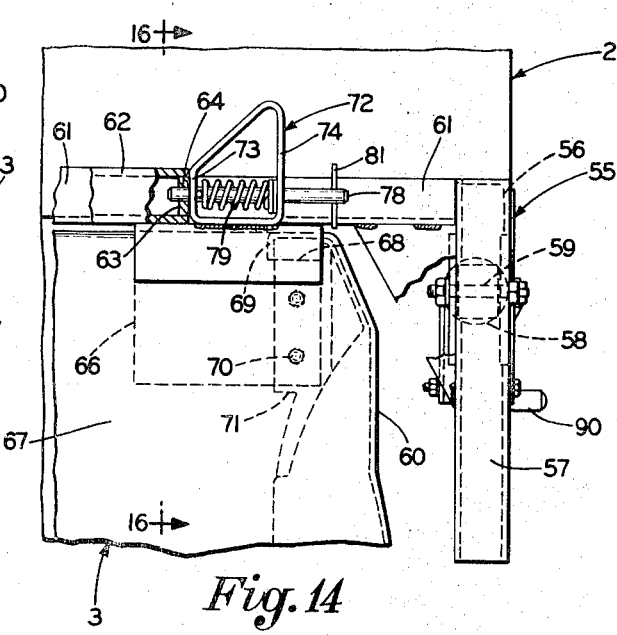
Fig.14
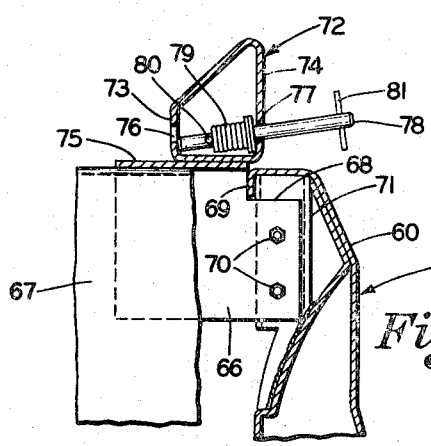
Fig.13
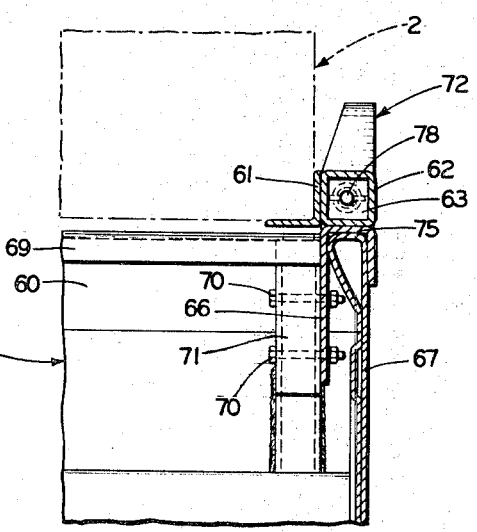
Fig.16
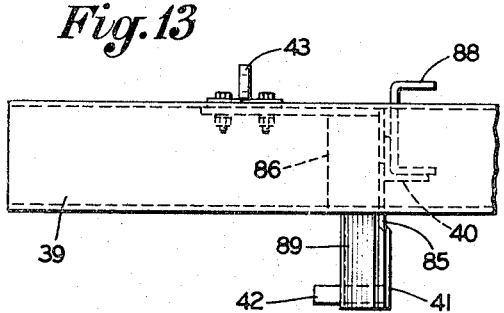
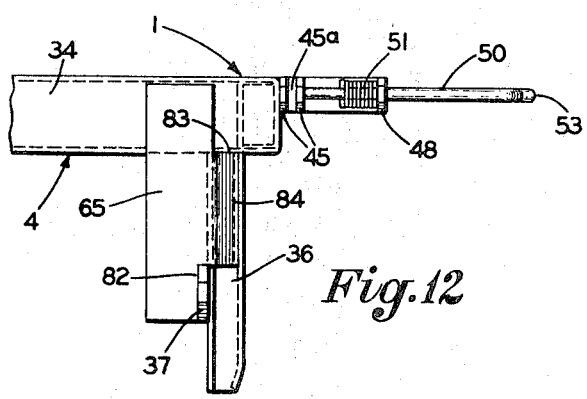
Fig.12
INVENTOR.
Daniel T. Hostetler
BY
Froase & Bishop
ATTORNEYS United States Patent Office  3,532,236
Patented Oct. 6, 1970

3,532,236
TRUCK CAMPER RIG WITH CAMPER AXLE DOLLY
Daniel T. Hostetler, Rte. 1, Fredricksburg, Ohio 44627
Filed Jan. 27, 1969, Ser. No. 794,236
Int. Cl. B60p 1/64, 3/40, 3/32
U.S. Cl. 214—515
19 Claims

ABSTRACT OF THE DISCLOSURE

A truck camper rig having a camper axle dolly for detachably connecting a camper unit to a truck. The dolly has an upper frame bolted to the underside of the camper near the rear end thereof, with means for rigidly coupling it to the rear bumper of the truck. It also has a lower frame pivotally connected to the upper frame through a linkage system. The axle, carrying the wheels of the dolly is connected to the lower frame as by spring means. Screw means or the like adjusts the linkage system to raise or lower the wheels relative to the camper unit.

Jack means raises the front end of the camper so that the truck may be backed beneath it. Spring loaded pins on the truck are inserted into ends of tube on front of camper for hooking up front of camper to truck. Square pins on truck rear bumper engage notched ears on dolly and interengaging perforate ears on truck bumper and dolly and spring loaded rotatable pins engage perforated ears for hooking up rear of truck to dolly.

BACKGROUND OF THE INVENTION

Field of the invention

The invention relates to a truck camper rig having a camper axle dolly for attachment to the rear end portion of a camper unit and comprising an upper frame for rigid connection to the camper as by bolts with means thereon for rigidly coupling the same to the rear bumper of a truck; and a lower frame pivotally connected to the upper frame by a linkage system and carrying an axle with wheels thereon suspended from the lower frame by spring means. Means, such as a screw, is provided for adjusting the linkage system so as to raise or lower the rear end portion of the camper relative to the wheels of the dolly.

Description of the prior art

The only prior art known to applicant is a product called the "Dodgen Tandem" made by Dodgen Industries, Inc., formerly Roadrunner, Inc.; and Adams Pat. No. 3,393,922 issued July 23, 1968.

The difficulty with the Dodgen construction is that it is impossible to make any adjustment for height to accommodate different loading. Also, if the rear wheels of the camper drop into a chuck hole, the entire rig can be stalled because of inability to obtain traction from the rear wheels of the truck.

In the Adams patent, while the dolly has a spring mounting for the axle, there is, however, no other structure which permits the dolly axle to be raised and lowered to distribute the load.

SUMMARY OF THE INVENTION

In general terms, the invention may be described as a truck camper rig with camper axle dolly comprising an upper frame bolted or otherwise rigidly connected to the underside of the rear portion of a camper unit and having means thereon for rigidly coupling the same to the rear bumper of the truck which draws the camper unit.

A lower frame is pivotally connected at its rear end to a depending portion of the upper frame, the forward end of the lower frame being pivotally connected to the forward end of the upper frame by a linkage system controlled by an adjusting screw for raising and lowering the pivoted lower frame relative to the upper frame.

Spring means, such as leaf springs, are suspended from the pivoted lower frame and carry the dolly axle upon which the wheels are mounted. By means of the adjusting screw the linkage system may be adjusted so that the vertical distance between the wheels or the ground and the rigidly mounted top frame may be changed as desired.

In this manner, if the camper unit is loaded with additional weight the wheels of the dolly may be raised or lowered as required with respect to the upper frame so as to distribute the load evenly between the camper axle and the wheels of the truck.

Also, if the camper unit is stuck with the rear truck wheels in a large depression, the adjusting screw may be turned to decrease the distance vertically between the wheels and the top frame so that the load is all carried on the rear truck wheels in the chuck hole where traction can be obtained. The adjustable dolly axle may also be used as a jack for raising the rear end of the truck to change the rear truck tires.

Novel means, including a square tube welded to the front end of the camper unit and spring-loaded pins mounted upon the truck, are provided for hooking up the front end of the camper unit to the truck body.

It is an object of the present invention to provide a camper axle dolly with means for raising and lowering the dolly axle to distribute the load.

A further object of the invention is to provide a camper axle dolly of the character referred to in which the wheels of the dolly may be raised so that the load is carried on the rear wheels of the truck attached to the camper by the dolly.

A further object of the invention is to provide such a camper axle dolly comprising an upper frame for bolting to the under-rear portion of a camper, a lower frame pivotally connected at one end to the upper frame, a linkage system pivotally connecting the other end of the lower frame to the upper frame, a wheel axle carried by the lower frame, and means for adjusting the linkage system for raising or lowering the dolly wheels relative to the upper frame.

A still further object of the invention is to provide a camper axle dolly of this type having means upon the upper frame for rigidly coupling the same to the rear bumper of a truck.

Another object of the invention is to provide a truck camper rig with a camper axle dolly of the character referred to.

A further object of the invention is to provide such a truck camper combination with means for hooking up the front end of the camper to the truck body and means for hooking up the dolly to the truck rear bumper.

These and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

BRIEF DESCRIPTION OF THE DRAWINGS

FIG. 5 is a plan sectional view of one end portion of the dolly and a portion of the rear end of the truck frame showing the truck backed up to the dolly prior to engagement for coupling, taken on the line 5—5, FIG. 2;

FIG. 6 is a fragmentary plan of a smaller portion of the truck frame and dolly showing the two hooked together in travel position, taken as on the line 6—6, FIG. 1;

FIG. 7 is a fragmentary horizontal section, taken on the line 7—7, FIG. 6, showing the parts in the coupled or hooked up position;

FIG. 8 is a view similar to FIG. 7 showing the position of the parts before the locking pin has been rotated to pull the parts together to coupled position;

FIG. 9 is an enlarged side elevation of the dolly and adjacent portions of the camper unit and truck showing the dolly hooked up or coupled to the truck bumper in the travel position of FIG. 1;

FIG. 10 is a view similar to FIG. 9 showing the dolly in raised position ready to be lowered for hookup to the truck;

FIG. 11 is a fragmentary section on the line 11—11, FIG. 10, showing how the dolly is fastened to the camper unit;

FIG. 12 is a vertical section taken on the line 12—12, FIG. 5;

FIG. 13 is a vertical section taken on the line 13—13, FIG. 5;

FIG. 14 is an enlarged vertical section taken on the line 14—14, FIG. 1;

FIG. 15 is an enlarged horiontal section taken on the line 15—15, FIG. 2;

FIG. 16 is a fragmentary section taken on the line 16—16, FIG. 14; and

FIG. 17 is a fragmentary section taken on the line 17—17, FIG. 15.

DESCRIPTION OF THE PREFERRED EMBODIMENT

Figure 1:
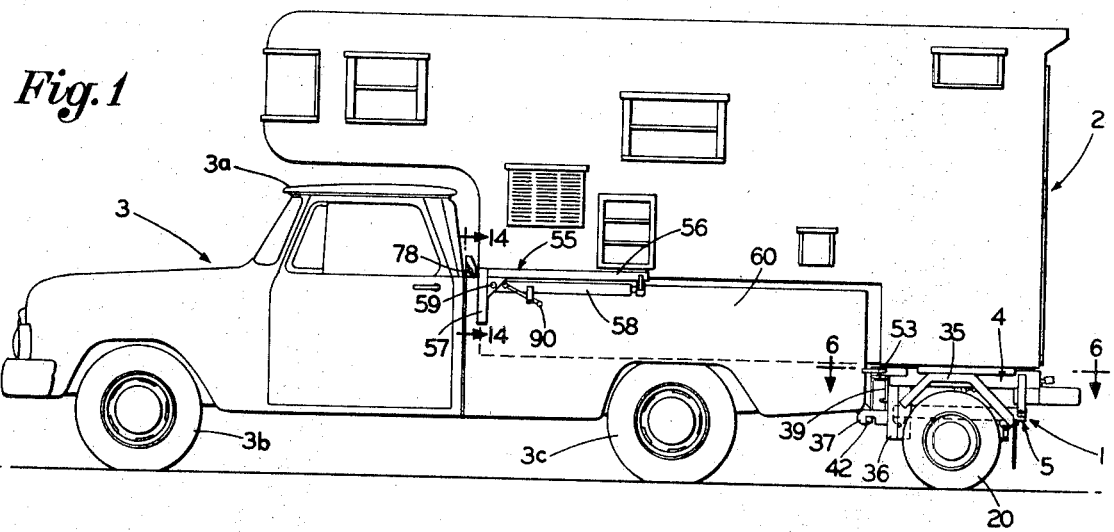
FIG. 1 is a side elevation of a camper unit equipped with the improved camper axle dolly and coupled to a truck.

Referring now more particularly to the embodiment illustrated in which similar numerals refer to similar parts throughout, the camper axle dolly to which the invention pertains is indicated generally at 1 bolted or otherwise rigidly connected to the underside of the rear end portion of the camper unit indicated generally at 2.

The camper unit is adapted to be detachably coupled to the rear end of a truck, indicated generally at 3, by means of the dolly, as will be described in detail hereinafter. The truck 3 has the usual cab 3a, front wheels 3b and rear wheels 3c. As will later be described, means is also provided for coupling the front end of the camper unit to the truck body.

The dolly 1 has an upper frace, indicated generally at 4, and a lower wheel supporting frame, indicated generally at 5. The upper frame 4 is rigidly connected to the camper unit 2 by bolts 6 located through the angle irons 7 which are welded to the underside of the camper unit 2.

The rear end of the lower frame 5 is pivotally connected, as shown at 8, to depending members 9 rigidly connected at their upper ends to the upper frame 4. The forward end of the lower frame 5 is pivotally connected, as indicated at 10, to the forward ends of lower links 11 of a linkage system. Each pivot 10 is located in a bracket 10a connected to a channel member 10b in the lower frame 5.

The lower frame 5 of the dolly is the wheel support frame and has the curved leaf springs 12 connected thereto. The forward end of each leaf spring 12 is pivotally connected, as at 13, to a depending projection 14 on the pivoted lower frame 5.

The rear end of each leaf spring 12 is pivotally connected at 15 to the lower end of a link 16, the upper end of which is pivotally connected at 17 to a depending projection 18 at the rear end of the lower frame 5.

The dolly wheel axle 19 is connected to the leaf spring 12 in any usual and well-known manner and the dolly wheels 20 are journalled upon the axle 19 by any conventional means.

The linkage system comprises the lower links 11 and the upper links 21, pivoted at their rear ends, as at 22, to the nonrotatable and extensible member 23 of a screw jack indicated generally at 24. The lower links 11 are rigidly joined together by cross braces 11a and the upper links 21 are rigidly joined together by similar cross braces 21a. The rotatable member 25 has a reduced trunnion or journal 26 at its rear end, journaled through a pivot block 27 (FIG. 5).

The pivot block 27 has trunnions 28 at each end journaled in flanges 29 upon the angle member 30 in the upper frame 4 of the dolly. A crank 31 (FIG. 10) may be detachably connected to the trunnion 26 of the screw jack for rotating the member 25 thereof and operating the linkage system for raising and lowering the dolly.

The forward end of each upper link 21 is pivotally connected at 32 to a bracket 33 attached to a channel member 34 in the top frame 4. With this construction it will be seen that when the screw jack 24 is operated to retract the member 23, the links 11 and 21 will be drawn toward each other, lowering the dolly as seen in FIG. 9.

When the screw jack is operated to extend the member 23, the links 11 and 21 will be spread apart, raising the dolly as shown in FIG. 10. A fender 35 is fixed upon the upper frame 4 above each wheel 20 of the dolly as best shown in FIGS. 5, 9 and 10.

A vertical member 36 is rigidly connected to the forward end of the rigid upper frame 4 and extends downwardly therefrom as best shown in FIGS. 9 and 10. Forwardly disposed notched ears 37 are rigidly connected to the vertical member 36 at a point spaced below the top frame 4, and each has a substantially square notch 38 in its lower edge.

The truck 3 has a rear bumper 39 connected thereto by the horiontal and angular brackets 40 and 41, respectively. Square pins 42 are rigidly connected to the bumper and adapted to be received in the notches 38 of the notched ears 37 on the dolly when the dolly is hooked to the truck bumper in travel position as best shown in FIG. 9.

As best shown in FIGS. 5 to 8 inclusive, there is an ear 43 at the top of the truck rear bumper 39 having an aperture 44 therein. This ear is adapted to be received between the rearwardly extending ears 45 on the top frame 4 of the dolly, as best shown in FIG. 6. The ears 45 are spaced apart forming a slot 45a to receive the bumper ear 43. The ears 45 are formed in a bracket, indicated generally at 46, extending outward to one side of the top frame 4 of the dolly.

This bracket has an angular outwardly and rearwardly disposed arm 47 terminating in the rearwardly disposed ear 48 parallel with the ears 45. The ears 45 have apertures 49 therein smaller in diameter than the aperture 44 in the truck bumper ear 43.

A spring-loaded pin 50 is located through an aperture in the ear 48. The coil spring 51 is wrapped around the pin 50 and interposed between the ear 48 and a projection 52 on the pin 50. In the uncoupled position, the spring-loaded pin 50 is pulled out of the apertures 49 in the ears 45 and kicked to one side, as best shown in FIG. 5, the spring 51 holding the pin 50 in this position.

For convenience in manually operating the same, the outer end of the pin 50 may be bent at an angle as shown at 53, forming a handle or crank by means of which the pin 50 may be moved longitudinally and turned upon its axis. The inner end of the spring-loaded pin 50 has a flat side, as indicated at 54.

Figure 2:
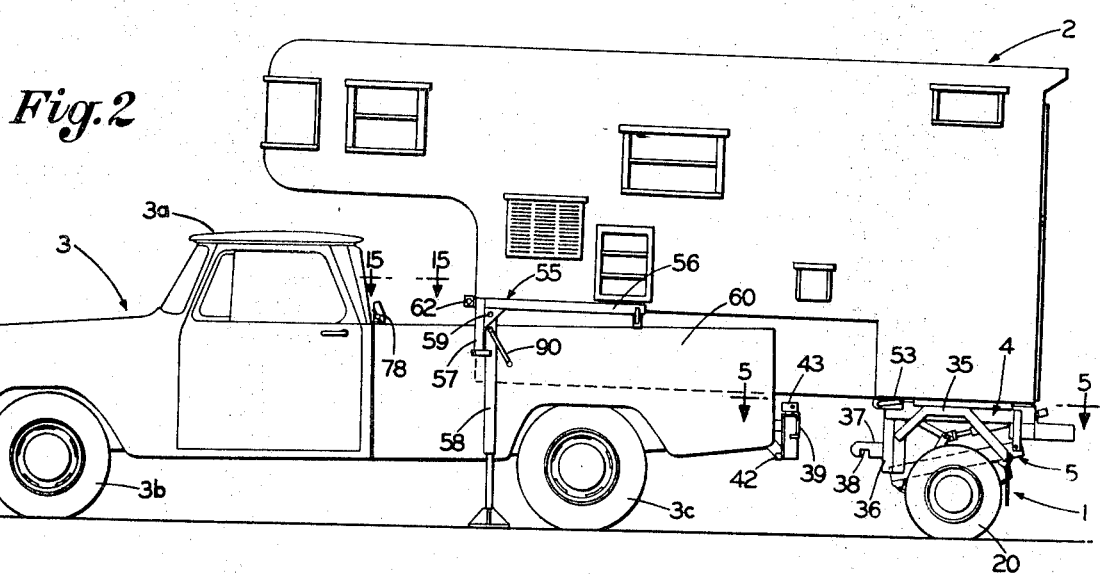
FIG. 2 is a view similar to FIG. 1 showing the camper unit uncoupled from the truck, the forward end of the camper unit being raised by jack means and the rear end thereof being raised by the linkage system in the dolly.
Figure 3:
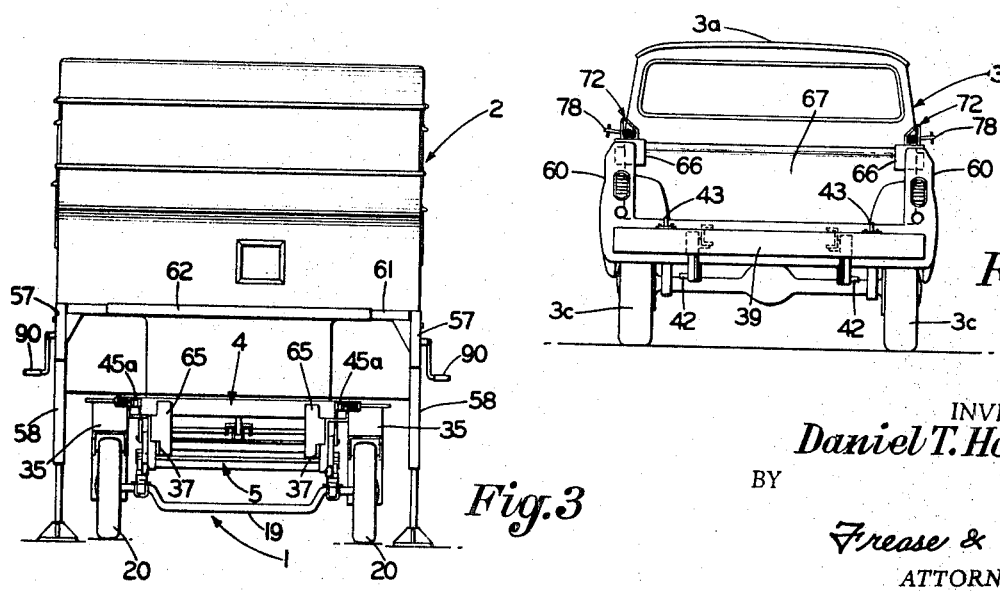
FIG. 3 is a front elevation of the camper jacked up as in FIG. 2 with the truck removed.
Figure 4:
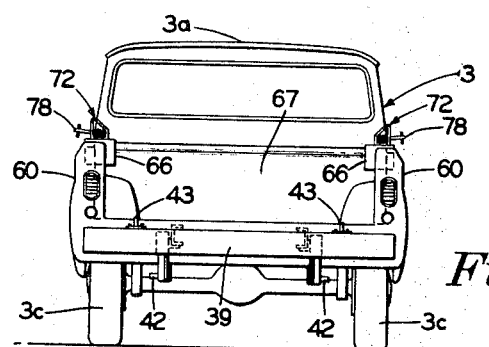
FIG. 4 is a rear elevation of the truck removed from the camper unit.

Referring now to FIGS. 14 to 17 inclusive, means is shown for coupling the front end of the camper unit 2 to the bed of the truck 3. A jack holder bracket 55 (FIGS. 1, 2 and 14) of angular shape, as shown in FIGS. 1 and 2, is welded or otherwise attached to each front corner of the camper unit and comprises the horizontal leg 56, extending rearwardly along the adjacent side of the camper unit, and the depending vertical leg 57 depending from each front corner of the camper unit.

A jack 58 is pivotally connected, as at 59, to the corner or angle of each jack holder bracket 55. As shown in FIG. 1, the jack is normally folded up in the bracket 55. In FIG. 2 the jack is shown down and extended to raise the front end of the camper unit 2 above the top edges of the side walls 60 of the truck bed.

An angle iron 61 is welded to the lower front corner of the camper unit 2 and a square steel tube 62 is welded upon the angle iron. A head 63 is welded in each end of the steel tube 62 and has an aperture 64 therein.

Pads 65 are welded on the front surface of the dolly frame, as best shown in FIGS. 5 and 6, for engagement by the rear bumper 39 of the truck when the dolly is hooked up to the truck.

A bracket 66, FIGS. 16 and 17, of inverted channel shape, is located over the rear end wall 67 of the truck bed. This bracket is notched as at 68 to clear the depending flange 69 on the adjacent side wall 60 of the truck bed. Bolts 70 connect the bracket to the stake body 71, which is welded on the side wall 60.

An inverted U-shape bracket, indicated generally at 72 and having spaced parallel walls 73 and 74, is welded upon the top web 75 of the bracket 66. Aligned apertures 76 and 77 are formed in the spaced walls 73 and 74, respectively, of the bracket 72.

A spring-loaded pin 78 is adapted to be slidable through the apertures 76 and 77. The coil spring 79 is wrapped around the pin 78 between the bracket wall 74 and the stop projection 80 on the pin 78 so that the left-hand end of the pin 78, as viewed in FIGS. 14, 15 and 17, is urged toward the left by the spring 79.

A handle 81 is formed upon the outer end of the spring-loaded pin 78 for the purpose of manipulating it. When not in use, the spring-loaded pin 78 is pulled out of the aperture 76 in the wall 73 of the bracket 72 and kicked to one side, as shown in FIG. 17.

As best shown in FIG. 12, each pad 65 depends below the top frame 4 of the dolly and is notched at 82 to accommodate the notched ear 37. Each pad is also notched at the bottom of the top frame 4, as indicated at 83, and the outer edge portion of the pad is bent back beneath the frame 4 at an angle, as indicated at 84, for guiding the notched ears 37 on the dolly into position when the truck is backed up for coupling to the dolly.

Each of the square pins 42 is welded to the lower end of the reduced portion 85 of an angle 86 which is welded to an angle 40 bolted or otherwise connected to the truck frame 88. An angularly located plate 89 is welded to opposite edges of the angle 85 which carries the adjacent square pin 42.

OPERATION

When it is desired to hook up the truck 3 and camper unit 2 together in travel position, as shown in FIG. 1, the jacks 58 are released from the jack holder brackets 55 and swung down to vertical position and operated by the jack operating cranks 90 to raise the forward end of the camper unit 2 sufficiently to clear the bed of the truck 3, as shown in FIG. 2.

The dolly 1 is operated by the crank 31 to raise the rear of the camper unit 2 to the position shown in FIG. 2 so that the notched ears 37 on the dolly are raised above the square pins 42 on the truck bumper.

The truck is then backed up so that the square pins 42 on the bumper are aligned vertically with the notches 38 in the ears 37 on the dolly, as shown in FIG. 10. The rear end of the camper unit is then lowered, by operating the crank 31 of the linkage system in reverse direction, so that the square pins are engaged by the notches 38 in the ears 37.

The front end of the camper unit is then lowered by operating the cranks 90 of the jacks 58 in reverse position so that the square pins 42 are latched in the notches 38 of the ears 37, as shown in FIG. 9.

The spring-loaded pins 78, on the front of the truck bed, are then moved out of the retracted position shown in FIG. 17 so that the inner ends thereof are aligned with the apertures 76 in the inner walls 73 of the brackets 72.

The spring 79 is then urged to the inner end of each pin 78 through the aperture 76 in the inner walls 73 of the bracket 72 and into the aperture 64 in the head 63 which is welded into the adjacent end of the square tube 62 upon the front end of the camper unit.

The ears 43 on the bumper are received in the slots 45a between the ears 45 on the dolly ready to be engaged by the spring-loaded pins 50. The spring-loaded pins 50 are then moved out of the position shown in FIG. 5 so that their inner ends are received through the apertures 49 in the ears 45 of the dolly bracket 46 and through the larger aperture 44 in the ear 43 upon the truck bumper, as shown in FIG. 8, with the flat side 54 of the pin 50 at the right, as viewed in the drawing. By means of the handle 53 each spring-loaded pin 50 is then given a one-half rotation to the position shown in FIGS. 6 and 7, drawing the dolly closer to the truck.

The traveling height of the dolly can be raised or lowered to a suitable height for travel. The amount of load in the camper unit and truck will require the raising or lowering of the dolly accordingly.

The dolly may be raised easily to raise the rear of the truck in case of a flat tire on the truck. In the event a rear wheel of the truck drops into a hole or is stuck in the mud so that there is no traction, the dolly may be easily raised to lift the truck wheel out of the hole or out of the mud. By placing a plank across the hole or upon the mud, the truck wheel may then have traction.

I claim:

1. A camper truck rig including a truck having side walls and a rear bumper, a camper unit, and a camper axle dolly, means rigidly connecting the dolly to the underside of the rear end portion of the camper unit, means coupling the forward end of the camper unit to the side walls of the truck, the dolly comprising an upper frame rigidly connected to the camper unit, a lower frame pivotally connected to the rear end of the upper frame, a linkage system pivotally connecting the forward end of the lower frame to the forward end of the upper frame, means for operating the linkage system to raise and lower the forward end of the lower frame relative to the forward end of the upper frame, a wheel axle carried by the lower frame, wheels upon the axle, and means coupling the forward end of the dolly to the truck bumper.

2. A camper truck rig as defined in claim 1 in which the means coupling the forward end of the camper unit to the side walls of the truck includes perforated heads extending forwardly from the front end of the camper unit, brackets upon the side walls of the truck, and spring-loaded pins in said brackets received in the perforations in said heads.

3. A camper truck rig as defined in claim 1 in which the means coupling the forward end of the camper unit to the side walls of the truck includes a horizontally disposed tube welded to the forward end of the camper unit, perforated heads in opposite ends of said tube, brackets upon the side walls of the truck, and spring-loaded pins in said brackets received in the perforations in said heads.

4. A camper truck rig as defined in claim 3 in which the horizontally disposed tube is square in cross section.

5. A camper truck rig as defined in claim 1 in which screw means operates the linkage system.

6. A camper truck rig as defined in claim 1 in which jacks for raising the forward end the camper unit are pivotally mounted in jack holders upon opposite sides of the camper unit.

7. A camper truck rig as defined in claim 1 in which the means coupling the forward end of the dolly to the truck rear bumper includes forwardly disposed notched ears on the forward end of the dolly and transversely disposed pins on the truck rear bumper received in the notches of said notched ears.

8. A camper truck rig as defined in claim 1 in which the means coupling the forward end of the dolly to the truck rear bumper includes spaced brackets on the forward end of the dolly, each bracket having a spaced pair of forwardly disposed apertured ears forming a slot therebetween, a spaced pair of rearwardly disposed apertured ears on the truck rear bumper received in said slots, and spring-loaded pins in said brackets received in the apertures of all of said ears.

9. A camper truck rig as defined in claim 7 including angular plates on the truck rear bumper for guiding said notched ears into alignment with said transversely disposed pins on the bumper.

10. A camper truck rig as defined in claim 7 in which the notches in said notched ears are square and said transversely disposed pins are square in cross section.

11. A camper truck rig as defined in claim 8 in which the means coupling the forward end of the camper unit to the truck rear bumper includes rearwardly disposed notched ears on the forward end of the dolly and transversely disposed square pins on the truck rear bumper received in the notches of said notched ears.

12. A camper truck rig as defined in claim 8 in which the apertures in the ears on the truck bumper are larger than the apertures in the ears on said brackets and in which the portions of the spring-loaded pins received in said apertures have flat sides and in which the spring-loaded pins are slidably and rotatably located in said brackets.

13. A camper axle dolly for a camper truck rig including a camper unit and a truck having a rear bumper, said camper axle dolly including an upper frame, means for rigidly attaching the upper frame to the underside of the rear end portion of a camper unit, a lower frame, means pivotally connecting the rear end of the lower frame to the rear end of the upper frame, a linkage system pivotally connecting the forward end of the lower frame to the forward end of the upper frame, means for operating the linkage system to raise and lower the forward end of the lower frame relative to the forward end of the upper frame, a wheel axle carried by the lower frame, wheels upon the axle, and means for coupling the forward end of the dolly to a truck rear bumper.

14. A camper axle dolly as defined in claim 13 in which screw means operates the linkage system.

15. A camper axle dolly as defined in claim 13 in which the means for coupling the forward end of the dolly to a truck rear bumper includes forwardly disposed notched ears on the forward end of the dolly and transversely disposed pins on the truck rear bumper adapted to be received in the notches of said notched ears.

16. A camper axle dolly as defined in claim 13 in which the means for coupling the forward end of the dolly to a truck rear bumper includes spaced brackets on the forward end of the dolly, each bracket having a spaced pair of forwardly disposed apertured ears forming a slot therebetween, a spaced pair of rearwardly disposed apertured ears on the truck rear bumper adapted to be received in said slots, and spring-loaded pins in said brackets adapted to be received in the apertures of all of said ears.

17. A camper axle dolly as defined in claim 15 including angular plates on the truck rear bumper for guiding said notched ears into alignment with said transversely disposed pins on the bumper.

18. A camper axle dolly as defined in claim 15 in which the notches in said notched ears are square and said transversely disposed pins are square in cross section.

19. A camper axle dolly as defined in claim 16 in which the apertures in the ears on the truck bumper are larger than the apertures in the ears on said brackets and in which the portions of the spring-loaded pins received in said apertures have flat sides and in which the spring-loaded pins are slidably and rotatably located in said brackets.

References Cited

UNITED STATES PATENTS 3,393,922   7/1968   Adams.

ALBERT J. MAKAY, Primary Examiner

U.S. Cl. X.R.

245—45; 280—23